(12) United States Patent
Peterreins et al.

(10) Patent No.: US 8,398,384 B2
(45) Date of Patent: Mar. 19, 2013

(54) LOW-NOISE ROTARY PUMP HAVING A PRESS-FIT STATOR USING SPLIT-CORE RIBS AND HOUSING RIBS

(75) Inventors: Thomas Peterreins, Nürnberg (DE); Achim Brunner, Bubenreuth (DE); Bernd Frühwald, Markt Erlbach (DE); Armin Suttner-Reimann, Schwabach (DE); Ramona Kiesel, Nürnberg (DE); Gerd Pecher, Friedberg (DE); Christian Schatz, Oberasbach (DE); Ingrid Späth, Nürnberg (DE)

(73) Assignee: Bühler Motor GmbH, Nürnberg (DE)

( * ) Notice: Subject to any disclaimer, the term of this patent is extended or adjusted under 35 U.S.C. 154(b) by 440 days.

(21) Appl. No.: 12/588,672

(22) Filed: Oct. 23, 2009

(65) Prior Publication Data

US 2010/0111730 A1    May 6, 2010

(30) Foreign Application Priority Data

Oct. 30, 2008 (DE) .......................... 10 2008 054 037

(51) Int. Cl.
*F04D 29/60* (2006.01)
*F04D 29/40* (2006.01)
*H02K 5/24* (2006.01)

(52) U.S. Cl. ......... 417/423.7; 310/86; 310/89; 310/257; 310/51; 29/596

(58) Field of Classification Search ............... 417/423.7; 310/88, 89, 428, 254.1, 86, 257, 51; 29/596
See application file for complete search history.

(56) References Cited

U.S. PATENT DOCUMENTS

| | | | | | |
|---|---|---|---|---|---|
| 1,833,747 | A | * | 11/1931 | Haughton | 228/138 |
| 2,330,207 | A | * | 9/1943 | England et al. | 413/1 |
| 4,381,465 | A | * | 4/1983 | Renkl et al. | 310/49.12 |
| 4,999,533 | A | * | 3/1991 | King et al. | 310/90 |
| 6,118,198 | A | * | 9/2000 | Hollenbeck et al. | 310/89 |

(Continued)

FOREIGN PATENT DOCUMENTS

| | | |
|---|---|---|
| DE | 102006021242 A1 | 10/2007 |
| JP | 2000018187 A | 1/2000 |

*Primary Examiner* — Devon Kramer
*Assistant Examiner* — Nathan Zollinger
(74) *Attorney, Agent, or Firm* — Jacobson Holman PLLC

(57) ABSTRACT

A rotary pump with a plastic pump housing, that can be processed by injection molding, with a first housing part defining a pump space, which is connected to a second intermediate housing part accommodating an electric motor with a wound core stator. The rotary pump includes a plastic split core, the wound claw pole stator being mounted on the split core and a permanent magnetic rotor being mounted to rotate within the split core. A plastic motor housing part defines a motor space, wherein at least three axial and parallel split core ribs are provided between the split core and the claw pole stator, the ribs being distributed about the periphery of the split core at predetermined angles relative to each other. A return ring has first and second end sections, the return ring being connected to the wound claw pole stator, so that the first and second end sections are welded to each other. The stator is press-fit onto the split core via the ribs. At least three axial-parallel housing ribs protrude radially inward and are formed with the motor housing part, the axial-parallel housing ribs being distributed on the inside periphery of the motor housing part. Finally, the stator is press-fit into the motor housing part via the housing ribs.

7 Claims, 3 Drawing Sheets

U.S. PATENT DOCUMENTS

| | | | |
|---|---|---|---|
| 6,144,137 A * | 11/2000 | Engelbert | 310/431 |
| 6,570,284 B1 * | 5/2003 | Agnes et al. | 310/89 |
| 2003/0178903 A1 * | 9/2003 | Rapp | 310/156.28 |
| 2005/0127768 A1 | 6/2005 | Welke et al. | |
| 2007/0286753 A1 * | 12/2007 | Ihle et al. | 417/423.7 |
| 2007/0290568 A1 | 12/2007 | Ihle et al. | |

* cited by examiner

LOW-NOISE ROTARY PUMP HAVING A PRESS-FIT STATOR USING SPLIT-CORE RIBS AND HOUSING RIBS

BACKGROUND OF THE INVENTION (1) Field of the Invention

The invention concerns a rotary pump with a pump housing, consisting of plastic material that can be processed by injection molding, with a first housing part delimiting a pump space, which is connected to a second intermediate housing part accommodating an electric motor, comprising a split core and consisting of plastic material, a wound claw pole stator of the electric motor being mounted on the split core and a permanent magnetic rotor being mounted to rotate within split core, and a motor housing part, consisting of plastic material that delimits a motor space.

(2) Description of Related Art Including Information Disclosed Under 37 CFR 1.97 and 1.98

A generic rotary pump is known from US 2007/0290568 A1. During joining of a slotted return with the claw pole stator, a deformation process of a tab is carried out in the known rotary pump, through which a slit in the return ring is narrowed and the return therefore lies tightly against the claw pole stator. However, it has turned out that this connection, because of the low rigidity of the tab, cannot guarantee complete freedom from play in each case over the entire lifetime and under a variety of temperature conditions. Under these circumstances, unpleasant noise, vibrations and possibly even resonances can occur.

BRIEF SUMMARY OF THE INVENTION

The task of the present invention ensures stable structure of a stator free of play in a generic rotary pump, so that no vibrations, noise or resonances occur, the design being simple and production economical.

This task is accomplished according to the invention in a rotary pump with a plastic pump housing, that can be processed by injection molding, with a first housing part defining a pump space, which is connected to a second intermediate housing part accommodating an electric motor with a wound core stator. The rotary pump includes a plastic split core, the wound claw pole stator being mounted on the split core and a permanent magnetic rotor being mounted to rotate within the split core. A plastic motor housing part defines a motor space, wherein three axial and parallel split core ribs are provided between the split core and the claw pole stator, the ribs being distributed about the periphery of the split core at predetermined angles relative to each other. A return ring has first and second end sections, the return ring being connected to the wound claw pole stator, so that the first and second end sections are welded to each other. The stator is press-fit onto the split core via the ribs. More than three axial-parallel housing ribs protrude radially inward and are formed with the motor housing part, the axial-parallel housing ribs being distributed on the inside periphery of the motor housing part. Finally, the stator is press-fit into the motor housing part via the housing ribs.

The axial-parallel ribs between the split core and the claw pole stator form the prerequisite for a stable and reliable connection free of play between the claw pole stator and the split core. The non-uniform angle distances of the ribs relative to each other ensure a low-resonance structure. The welding connection between the return ring and the claw pole stator is particularly stable and inflexible, for which reason the produced mechanical connection remains free of play and firm under all conditions to be expected. The ribs between the claw pole stator and the split core, after press-fitting of the claw pole stator, produce a firm connection free of play with the split core. The ribs on the split core also ensure stable mechanical connection free of play during connection between the return ring and the motor housing part. It is precisely the different number of ribs and their distribution that can suppress the formation of resonances without additional damping measures.

The task is also solved by a method wherein no additional noise damping devices are installed between the claw pole stator and the motor housing part and between the claw pole stator and the split core, in which assembly is facilitated by the larger diameter of the rolled return ring on the claw pole stator. Press-fitting of the return ring on the claw pole stator with simultaneous laser welding of the edge sections of the return ring to each other permits excellent firm connection free of play, which is so inflexible that the connection persists over the entire lifetime. The occurrence of noticeable vibrations is avoided on this account. By press-fitting the compact stator in the split core and the motor housing part on the claw pole stator, an overall more stable and low-noise structure is achieved with simple and economical assembly.

BRIEF DESCRIPTION OF THE SEVERAL VIEWS OF THE DRAWINGS

Practical examples of the invention are further explained below with reference to the drawings. In the drawings.

DETAILED DESCRIPTION OF THE INVENTION

Figure 1:
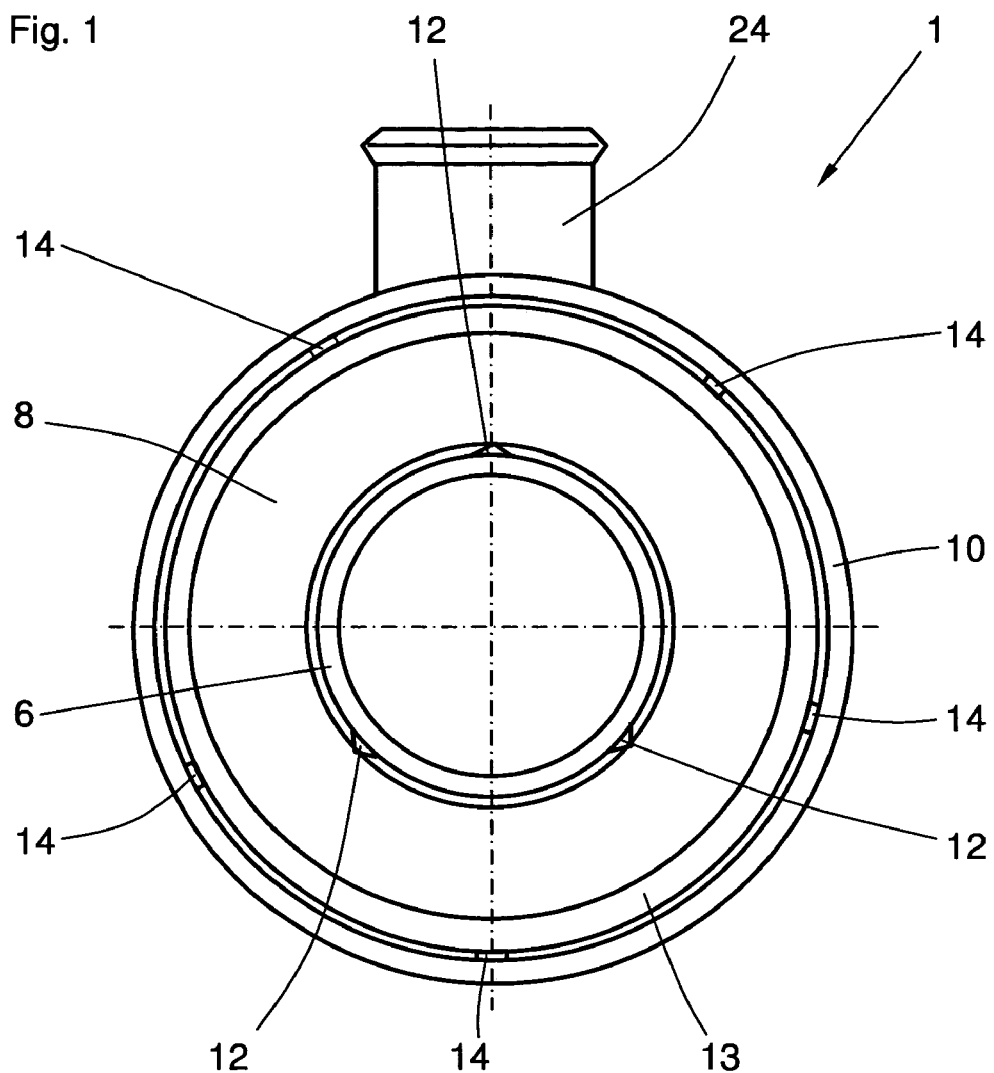
FIG. 1 shows a sketch with a section through an electronically commutated DC motor of a rotary pump.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a sketch with a section through an electronically commutated DC motor of a rotary pump 1 with a pressure connector 24, a motor housing 10, a split core 6 as component of an intermediate housing part, a claw pole stator 8 and a return ring 13. The split core 6 has three axial-parallel ribs 12 distributed at large angles around its periphery. In a preferred embodiment, the ribs 12 are formed in one piece with the split core. The ribs are not uniformly arranged, but are arranged at different distances relative to each other. This causes a reduction of resonances that might occur during operation. The three ribs 12 should have a minimum spacing of 20.degree. and a maximum spacing of 170.degree. to the adjacent rib 12. The claw pole stator is press-fit onto these three ribs. In another embodiment, the split core ribs are in one piece with the claw pole stator and protrude radially inward from the claw pole stator. The motor housing 10 has five axial-parallel housing ribs 14 protruding from the wall of the housing on the inside of the wall. These housing ribs are distributed essentially uniformly over the interior periphery of the motor housing part 10. The motor housing part 10, which is cylindrical in its base shape, is press-fit onto the return ring 13 of the claw pole stator, so that the housing is deformed to slightly resemble a pentagon. The deformation of the housing means that all five housing ribs 14 lie against the return ring and undefined states do not occur here, so that clearance between a housing rib 14 and the motor housing part 10 and therefore noise development cannot occur even accidentally. The return ring 13 is rolled from a sheet strip and its end sections welded to each other. However, no welded connection exists between the return ring 13 and the claw pole stator.

Figure 2:
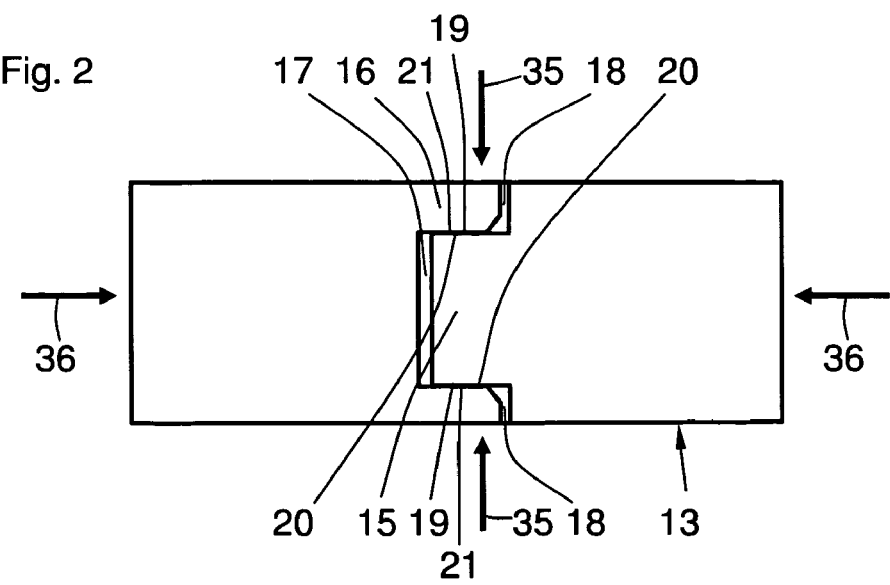
FIG. 2 shows a sketch of a rolled return ring.

FIG. 2 shows a sketch of the rolled return ring 13 in the welded state with a male end section 15, a female end section 16, which engage with each other, leaving a first clearance 17 and a second clearance 18. The clearances 17, 18 are dimensioned so that under all tolerance states of the claw pole stator and return ring and the tolerance of the pressing force during assembly, reliable connection free of play can always be produced between the components being joined. In order to facilitate welding by a laser beam, two welding seams 21 are provided, which have a sufficiently large spacing from each other, in order to offer sufficient space for the clamping jaws and the laser beam. The two end sections 15, 16 lie against each other in edge sections 19, 20, so that a good welding connection is possible. The welding seams 21 join the adjacent edge sections at least partially to each other. The welding seams 21 are shear-loaded during operation and therefore represent a very strong and inflexible connection. As additional securing for the connection between the return ring 13 and the claw pole stator, punched tabs can be deformed inward on the return element. Axial position securing is therefore guaranteed. Securing can also be produced by the housing parts, consisting of plastic material.

Figure 3:
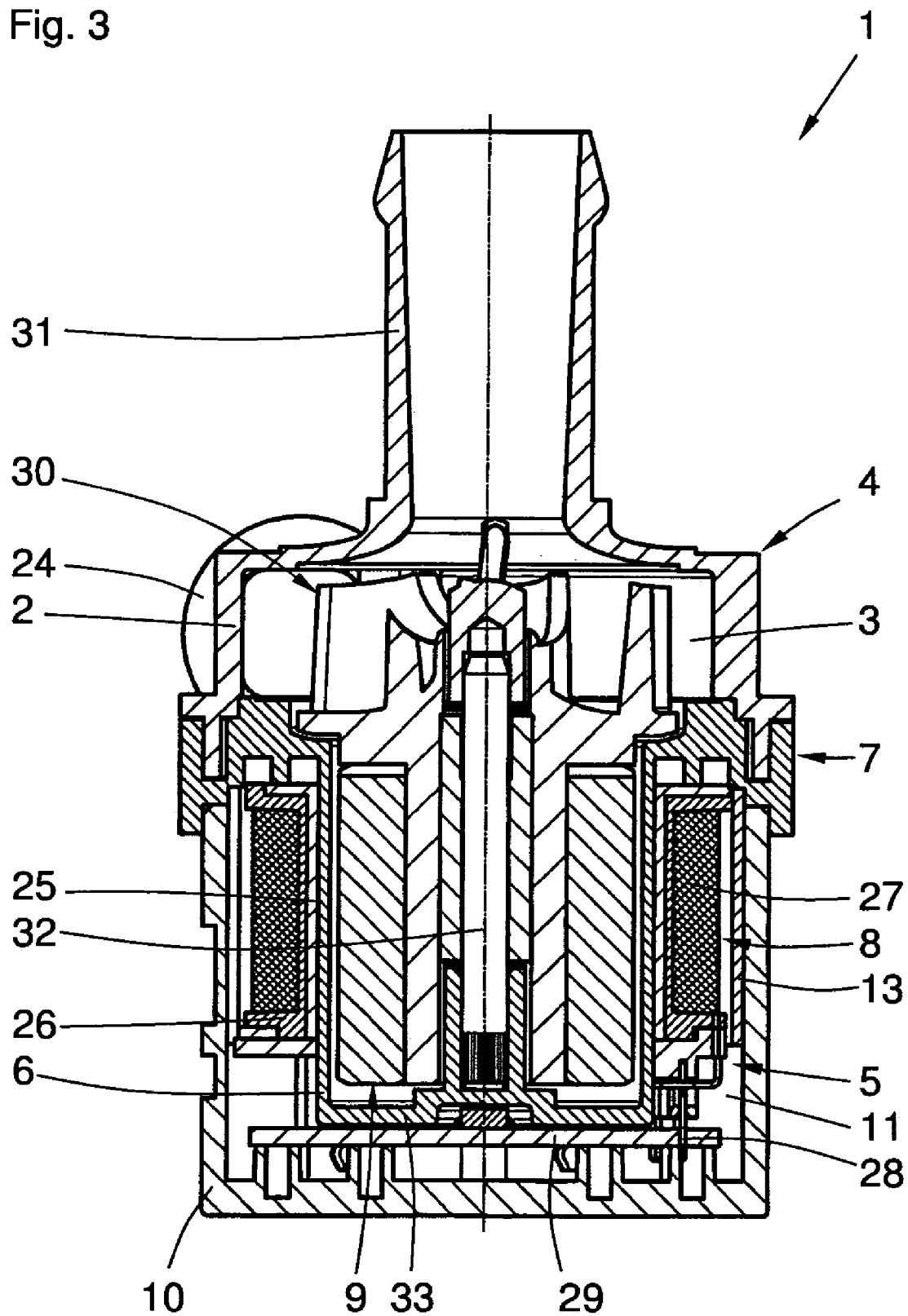
FIG. 3 shows a sectional view through the rotary pump and FIG. 4 shows a schematic of a welding device.

FIG. 3 shows a sectional view of the rotary pump 1 with pump housing 2, which delimits pump space 3, the intermediate housing part 7, with split core 6, the claw pole stator 8, the return ring 13 and the motor housing part 10, which defines an interior motor space 11. The claw pole stator has claw poles 25, an insulation element 26, a winding 27 and connections 28. The connections, in the form of contact pins, produce electrical connection with a circuit board 29. The insulation element can be produced by injection molding around the claw poles. Within the split core 6 there is a permanent magnetic rotor 9 mounted to rotate, whose hub is in one piece with a pump impeller 30. The pump housing 2 is in one piece with a suction connector 31 and a pressure connector 24. The rotor is mounted on a shaft 32 fastened in a bottom 33 of the split core.

Figure 4:
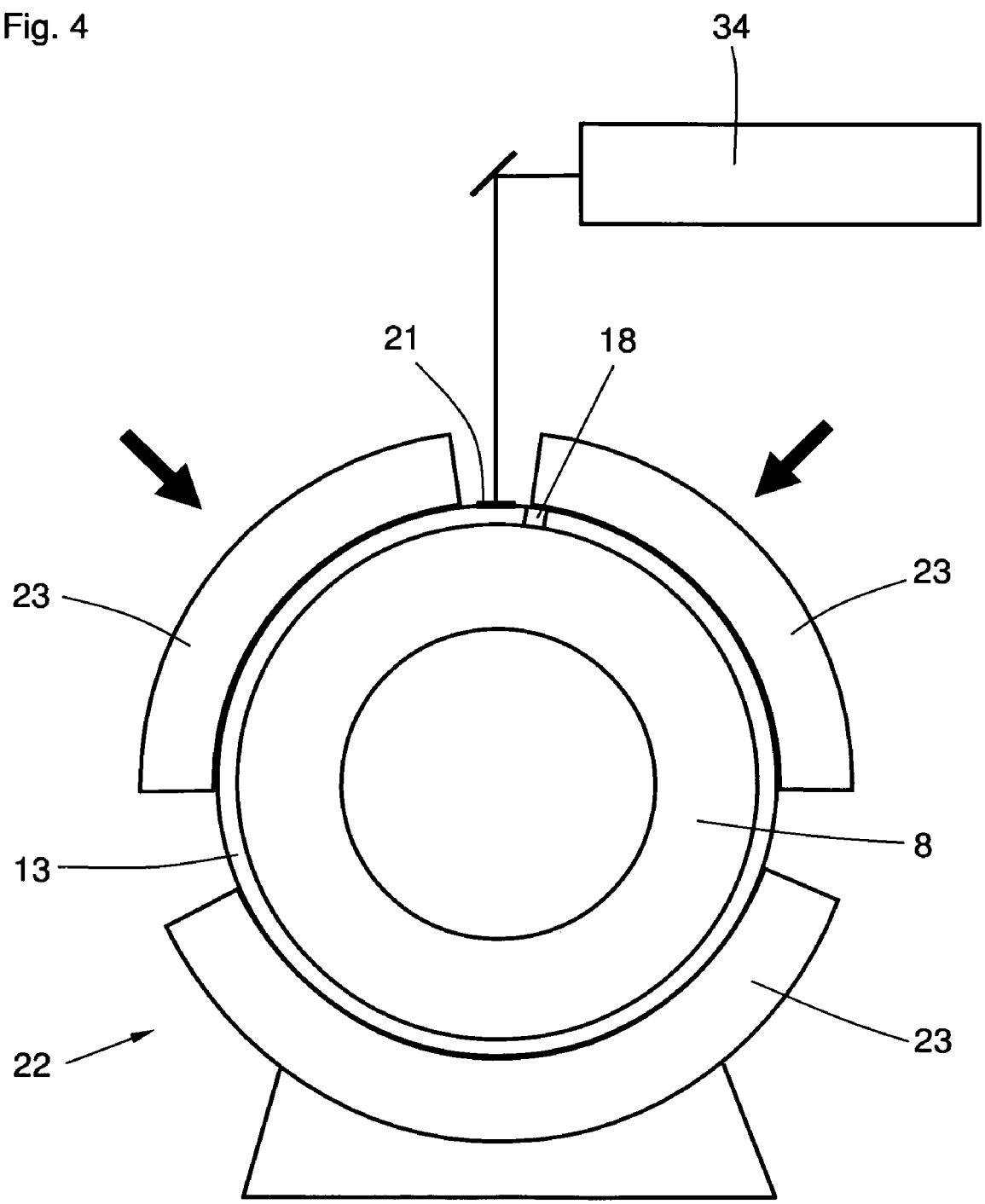

FIG. 4 shows a welding device 22 with three moving clamping jaws 23, which ensure contact of a return ring 13 on the claw pole stator 8 free of play. Before inserting the stator parts into the welding device 22, they must be joined. For this purpose, the return ring is widened somewhat, so that it can be pushed onto the claw pole stator without effort. The rolling tool is set up so that no additional working process for widening is necessary. A laser 34 generates a high-energy pulse laser beam of defined power and duration. During the welding process, the clamping jaws 23 press the return ring 13 against the claw pole stator 8 and, at the same time, the female end section 16 is forced against the male end section, both in the tangential and axial-parallel direction, so that the clearance 18 is reduced. The joining gaps in the area of welding seams 21 should be large enough, so that joining of the end sections 15 and 16 can occur without problem, but they should be as narrow as possible, in order to permit welding. Because of stress on the end sections 15, 16 in the axial-parallel direction 35, the joining gaps between the end sections are at least partially closed and this is conducted by an additional tool punch, not shown here. The axial-parallel force direction 35 and the tangential force direction 36 are shown in FIG. 2. The welding device is dimensioned, so that the laser beam can reach the welding site unhampered and generate welding seams 21 of sufficient length. The depicted welding device is only shown as a sketch. A number of other variants are possible and this also pertains to the number of clamping jaws and their shape.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically disclosed.

LIST OF REFERENCE NUMBERS

1 Rotary pump
2 Pump housing
3 Pump space
4 Housing part
5 Electric motor
6 Split core
7 Intermediate housing part
8 Claw pole stator
9 Rotor
10 Motor housing part
11 Motor space
12 Ribs
13 Return ring
14 Housing ribs
15 Male end section
16 Female end section
17 First clearance
18 Second clearance
19 Edge section
20 Edge section
21 Welding seam
22 Welding device
23 Clamping jaws
24 Pressure connector
25 Claw pole
26 Insulation element
27 Winding
28 Connection
29 Circuit board
30 Pump rotor
31 Suction connector
32 Shaft
33 Bottom
34 Laser
35 Axial-parallel force direction
36 Tangential force direction

What is claimed is:

1. A rotary pump comprising:
an electric motor having a wound claw pole stator;
a plastic pump housing, with a first housing part that defines a pump space;
a plastic intermediate housing part connected to the first housing part and which accommodates the electric motor, the intermediate housing part having a split core;
means for mounting the wound claw pole stator of the electric motor on the split core;
a permanent magnetic rotor mounted to rotate within the split core; and
a plastic motor housing part, defining a motor space, wherein
a) three axial and parallel split core ribs are provided between the split core and the claw pole stator, the ribs being distributed about the periphery of the split core at non-uniform angle distances between them;
b) a return ring has first and second end sections, the return ring being connected to the wound claw pole stator, so that the first and second end sections are welded to each other;
c) the stator is press-fit onto the split core via the ribs;
d) more than three axial-parallel housing ribs protrude radially inward and are formed with the motor housing part, the axial-parallel housing ribs being distributed on the inside periphery of the motor housing part; and
e) the stator is press-fit into the motor housing part via the housing ribs.

2. The rotary pump according to claim 1, wherein the motor housing part has five housing ribs protruding radially inward.

3. The rotary pump according to claim 1, wherein the split core ribs are in one piece with the split core and protrude radially outward from the split core.

4. The rotary pump according to claim 1, wherein the angle distances of the split core ribs are at least 20°.

5. The rotary pump according to claim 1, wherein the largest angle distance of the split core ribs is about 170°.

6. The rotary pump according to claim 1, wherein the space between the claw pole stator and the motor housing part and the space between the claw pole stator and the split core are free of any additional damping devices.

7. A rotary pump comprising:
an electric motor having a wound claw pole stator;
a plastic pump housing, with a first housing part that defines a pump space;
a plastic intermediate housing part connected to the first housing part and which accommodates the electric motor, the intermediate housing part having a split core;
means for mounting the wound claw pole stator of the electric motor on the split core;
a permanent magnetic rotor mounted to rotate within the split core; and
a plastic motor housing part, defining a motor space, wherein
a) three axial and parallel split core ribs are provided between the split core and the claw pole stator, the ribs being distributed about the periphery of the split core at predetermined angles relative to each other;
b) a return ring has first and second end sections, the return ring being connected to the wound claw pole stator, so that the first and second end sections are welded to each other, wherein, the first end section of the return ring is a male end section with two adjacent edge sections and the second end section of the return ring is a female end section with two edge sections, the first and second end sections meshing with each other in a tangential direction, leaving a clearance, and the two adjacent edge sections of the male end section lie against each other on the corresponding edge sections of the female end section, and the adjoining edge sections are at least partially welded to each other;
c) the stator is press-fit onto the split core via the ribs;
d) more than three axial-parallel housing ribs protrude radially inward and are formed with the motor housing part, the axial-parallel housing ribs being distributed on the inside periphery of the motor housing part; and
e) the stator is press-fit into the motor housing part via the housing ribs.

* * * * *